UNITED STATES PATENT OFFICE.

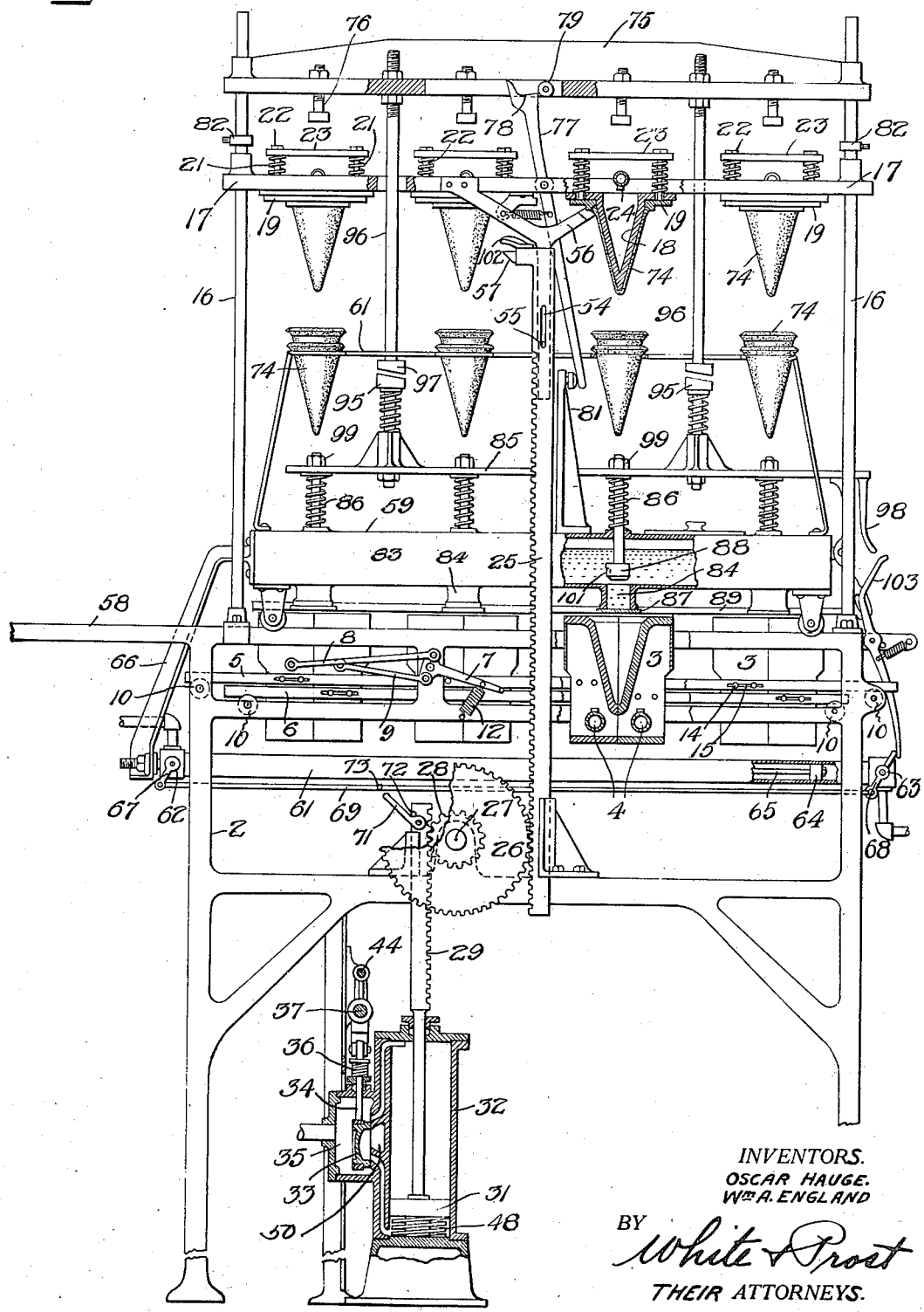

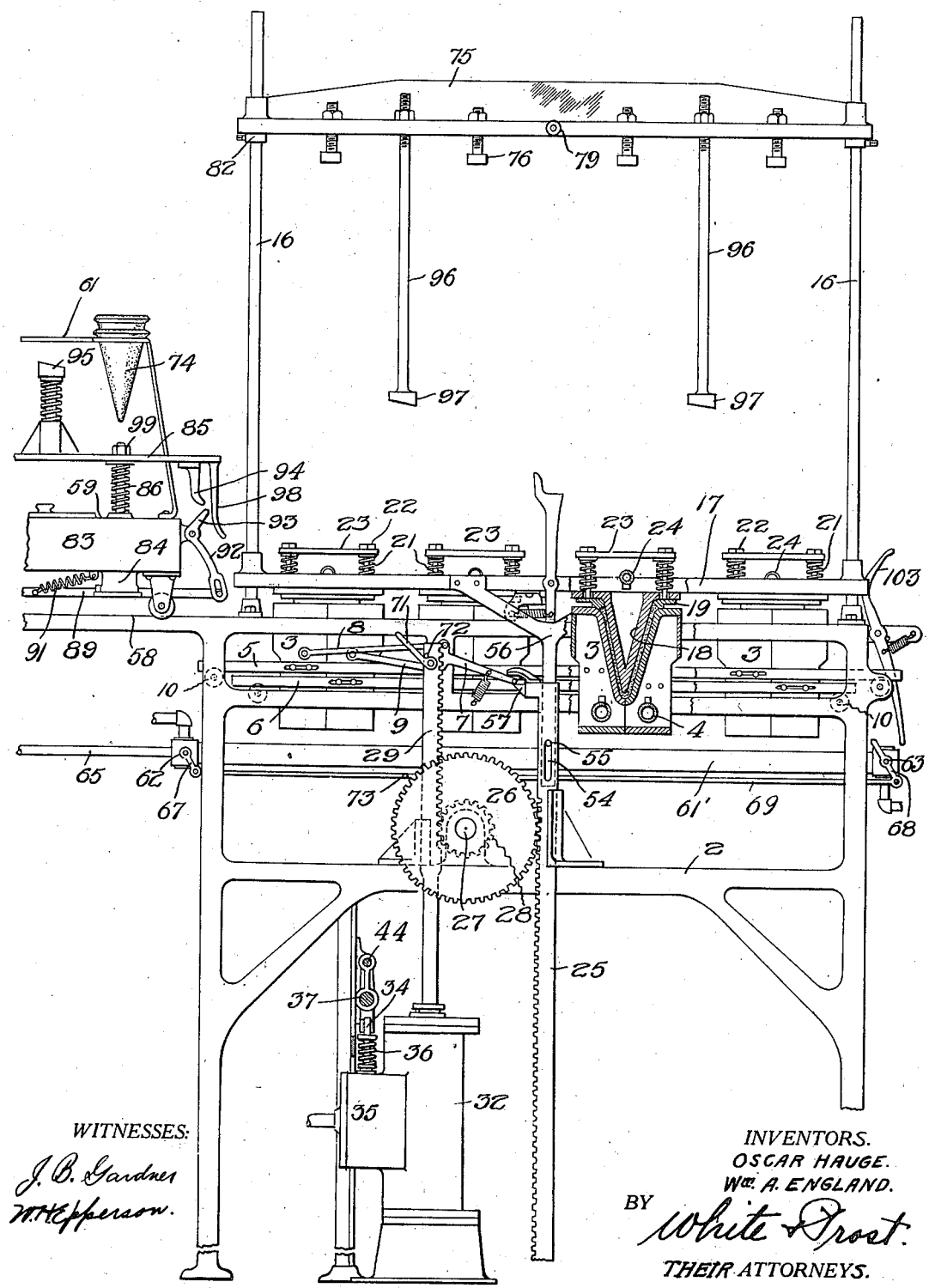

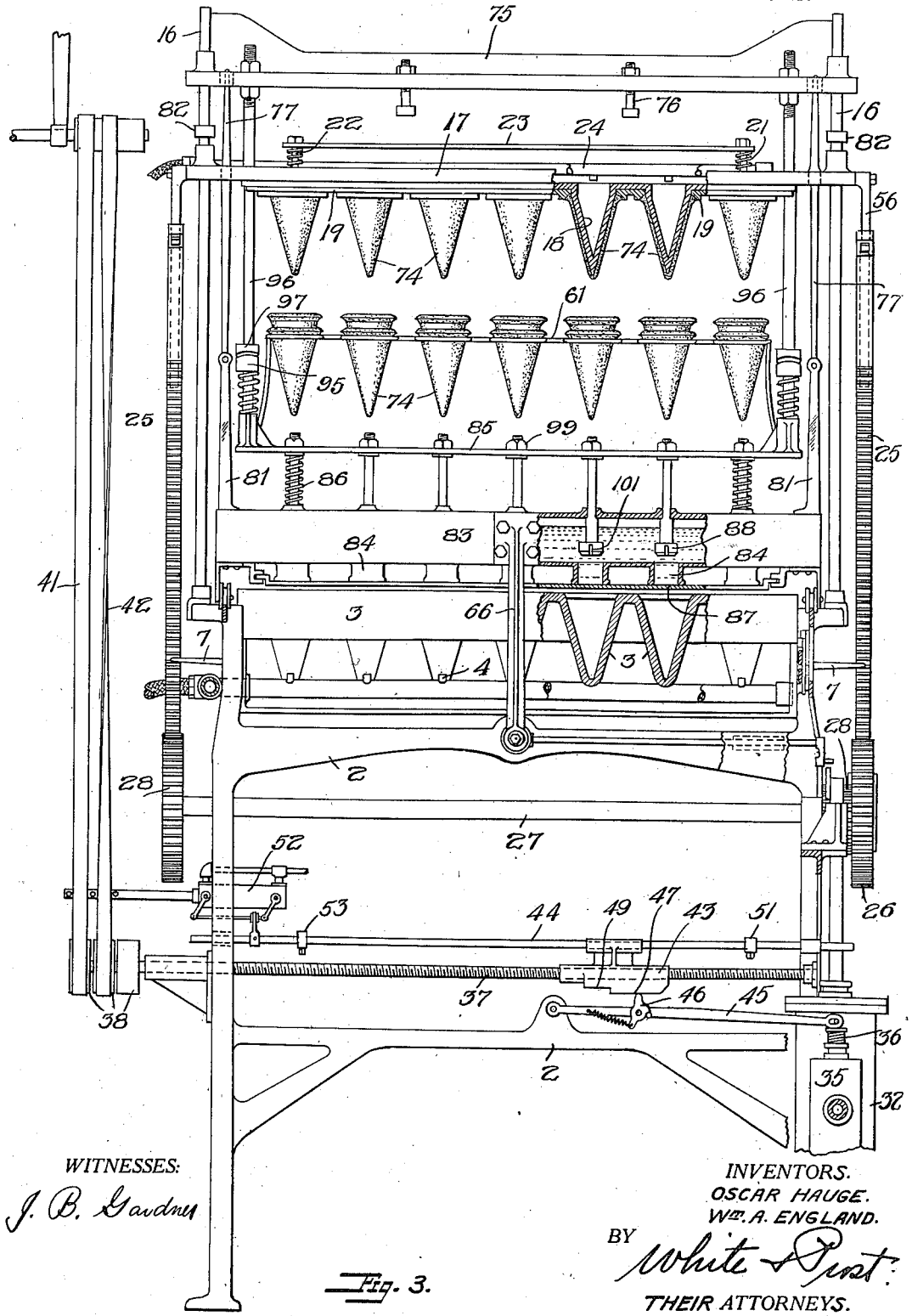

OSCAR HAUGE AND WILLIAM A. ENGLAND, OF SAN FRANCISCO, CALIFORNIA.

MACHINE FOR MAKING PASTRY-SHELLS.

1,310,990.  Specification of Letters Patent.  Patented July 22, 1919.

Application filed February 19, 1917. Serial No. 149,456.

*To all whom it may concern:*

Be it known that we, OSCAR HAUGE, a subject of the King of Norway, and WILLIAM A. ENGLAND, a citizen of the United States, both residents of the city and county of San Francisco, State of California, have invented a certain new and useful Machine for Making Pastry-Shells, of which the following is a specification.

The invention relates to a machine for making pastry shells and particularly cone-shaped shells for the reception of ice-cream and ices, usually known as ice-cream cones.

An object of the invention is to provide an automatic machine for making pastry shells.

Another object of the invention is to provide means for automatically placing measured charges of batter into the molds.

A further object of the invention is to provide means for varying the time of baking the shells.

A further object of the invention is to provide means for removing the baked shells from the machine.

The invention possesses other advantageous features, some of which, with the foregoing, will be set forth at length in the following description where we shall outline in full that form of the invention which we have selected for illustration in the drawings accompanying and forming part of the present specification. In the drawings we have shown one specific embodiment of our generic invention, but it is to be understood that we do not limit ourselves to such form, since the invention, as expressed in the claims, may be embodied in a plurality of forms.

Referring to said drawings:

Figure 1 is a side elevation of the machine showing the taps raised and the cone basket in position to receive the cones from the taps, parts of the machine being shown in section and parts thereof being broken away to reduce the size of the figure.

Fig. 2 is a similar view showing the cone basket removed and the taps disposed in the molds.

Fig. 3 is an end elevation of the machine with the parts in the position shown in Fig. 1.

The machine in its general aspect comprises a plurality of molds and associated taps arranged to nest therein, means for heating the molds and taps to bake the shells, means for regulating the baking of the shells, means for withdrawing the taps from the molds and for removing the shells from the taps, means for collecting and removing the shells, means for introducing the batter into the molds and means for seating the taps in the molds. The various mechanisms for performing these functions are associated and coördinated in the machine so that the machine operates automatically to produce baked pastry shells. While we have termed the invention a machine for making pastry shells, it is to be understood that it is not limited to such use, but may be employed for whatever purpose it may be put.

Compressed air is preferably employed as the power for operating the machine and a mechanically driven timing mechanism is employed for controlling the flow of the compressed air. The machine includes a suitable frame 2 upon which the various operating parts are arranged. Mounted on the frame are a plurality of split molds 3 in which the shells are baked, the molds being heated from below by flames issuing from the gas burners 4. Each mold 3 is split vertically on its center line and means are provided for separating the mold parts slightly to facilitate the withdrawal of the baked shell. The molds are arranged in rows, in the present machine there being seven molds in each row and there being four rows, there being no limitation however as to the number of rows or to the number of molds in a row. One-half of each mold in each row is connected to and mounted on a slide 5 and the other half is mounted on and connected to a slide 6, and corresponding slides for the various rows are connected together, so that all of the molds are simultaneously opened and closed. The slides 5 and 6 are mounted on rollers 10 on the frame, so that they are readily movable. Mounted on the frame 2 is a lever 7 having opposite extensions to which the two parts of a mold are respectively connected by links 8 and 9, so that movement of the lever is accompanied by movements of the mold parts in opposite directions. The lever 7 is normally held in such position as to hold the molds closed by a spring 12. The means for moving the lever to open the molds slightly will be hereinafter described. For the making of ice-cream cones, the molds are cone-shaped, but various shaped molds may be used depending upon the shape of pastry shell it is desirable to produce. The mold parts are adjustably secured to the slides 5 and 6 by bolts 14 engaging the mold parts and extending through slots 15 in the slides, so that the positions of the mold parts may be adjusted to insure tight closing of all of the molds.

Arranged above the molds and slidable on the upright guides 16, which are secured to the frame 2, is a frame 17 which carries the conical taps 18 which are adapted to seat in the molds. This plate or frame 17 reciprocates vertically to carry the taps 18 into and out of the molds. Surrounding the base of each tap is a stripper plate 19, normally held in its upper position with respect to the taps, by springs 21. Extending through the springs and secured to the stripper plate are bolts 22 which are connected together at their upper ends by the bars 23. A blow or downward pressure on these bars depresses the stripper plates, thereby dislodging the baked shells 74 from the taps. The stripper plates also serve to limit the downward movement of the taps into the molds, so that sufficient space is left between the mold and the tap to form a shell of the desired thickness. Arranged above the taps are gas burners 24 which are disposed to direct flames into the hollow taps for heating them in order that the shells may be properly baked.

Means are provided for vertically moving the plate 17 with the taps mounted therein, at predetermined times, so that the required time is provided for baking the shells and for carrying out the other functions of the machine. Arranged at the sides of the machine and properly guided thereon are vertically movable rack-bars 25 which engage pinions 26 secured to the shaft 27. Secured to the shaft 27 is a pinion 28 which is engaged by the rack-bar 29, which is connected to the piston 31 disposed in the cylinder 32. Admission of air under pressure into the upper end of the cylinder 32 depresses the piston therein and causes the rack-bars 25 to be raised. The admission and exhaust of air from the cylinder is controlled by the slide valve 33, the stem 34 of which extends through the compressed air box 35. The valve stem is normally pressed upward by a spring 36 and the valve is normally positioned to admit air below the piston. Means are provided for timing the operation of the valve. Mounted in suitable journals arranged on the frame is a power driven screw spindle 37 which is provided on its end with pulleys 38 which are engaged by direct and reverse drive belts 41—42, so that as the belts are shifted, the direction of rotation of the spindle is reversed. Engaging the spindle is a shoe 43, which is prevented from rotating by engagement with the rod 44 slidable longitudinally in the frame and arranged parallel with the screw spindle. As the spindle rotates, the shoe is advanced in the direction of the progression of the thread. Pivoted to the valve stem 34 and lying adjacent to and preferably substantially parallel with the spindle 37 is a lever 45, pivoted at its other end to the frame 2. Mounted on the lever 45 is a spring-held latch 46 which is engaged by the shoe 43 as it is fed along by the spindle. The latch is arranged so that when engaged by the shoe traveling in one direction, the lever 45 is depressed and when engaged by the shoe traveling in the other direction, rotates on its pivot and does not cause a depression of the lever. The shoe is provided on its under or latch engaging surface with a cam face, preferably divided into two steps. As the shoe progresses to the right (Fig. 3), the high face 47 engages the latch 46, depressing the lever 45 and operating the slide valve 33 to admit air to the top of the cylinder 32 and thereby raise the frame 17 and hold it in the raised position. A spring 48 at the bottom of the cylinder cushions the movement of the piston as it reaches its lower position. The shoe 43 continues to move toward the right, bringing the lower cam face 49 into engagement with latch 46 and permitting the valve 33 to rise a sufficient distance to cut off the supply of compressed air to the top of the cylinder and to connect the exhaust passages 50 with such portion of the cylinder. The frame 17, with the taps thereon, then descends by gravity, bringing the taps into the molds. In the meantime the shoe has moved to the right and the low face 49 has passed the latch 46, allowing the valve stem to rise and admit air under pressure below the piston, thereby forcing the taps into the molds and causing the batter in the molds to be distributed throughout the spaces between the taps and the molds. The shoe continues to the right and engages a collar 51 on the rod 44, shifting the rod to the right. The rod 44 is connected to the valves of a compressed air belt shifter 52 and the movement of the rod operates the valves and causes the belts to be shifted. The spindle 37 then rotates in the opposite direction, causing the shoe to travel to the left until it engages the collar 53 and moves the rod 44 to the left, thereby operating the belt shifter, to cause the direction of rotation of the spindle to be again reversed. The collars 51 and 53 are adjustable on the rod 44 so that the time of baking of the shells may be adjusted when desired.

When the baking process is complete, means are provided for operating the mold opening means, before the taps, with the shells adhering thereto, are withdrawn from the molds. The plate 17 is slidably attached to the rack bars 25 and the amount of the sliding is controlled by a slot 54 in the rack bar in which there is disposed a pin 55, secured to the bar 56 which is attached to the plate 17. When the rack bar is in its lowest position the taps are pressed into the molds by contact of the pin 55 with the upper end of the slot 54. With the parts in this baking position, the split molds are locked against opening by a projection 102 on the bar 25 which engages with and holds the lever 7 against upward movement. When the rack bar is in its depressed position, the pin 55 contacts with the upper end of the slot (Fig. 2) so that when the rack bar starts upward it has a short movement independent of the tap carrying frame 17. Arranged on the rack bar is a spring pressed latch 57 which, in the initial upward movement of the rack bar, engages and rocks the lever 7 to open the molds and holds the molds open until the taps start out of the molds. On the downward movement of the rack bar, the latch 57 is pushed back by the contact with the lever 7 so that it again takes position below the lever 7.

Means are also provided for receiving the baked shells when they are discharged from the taps. On the upward movement of the rack bars, the tap-carrying frame 17 is raised a sufficient distance to allow a shell receiving basket or tray to slide in under the taps. Arranged at opposite sides of the machine are tracks 58 upon which is mounted a carriage 59 containing a basket or tray 61 for receiving the shells. The carriage 59 is moved in and out of position below the taps by compressed air. Arranged on the frame is a cylinder 61', provided with valves 62, 63 at opposite ends and having a piston 64 connected by the piston rod 65 to a bracket 66 on the carriage. The valves 62 and 63 are provided with levers 67-68 which are connected by the rod 69, so that the valves operate simultaneously, and the valves are arranged so that when one end of the cylinder is in communication with the source of air under pressure, the other end is in communication with the atmosphere, and vice versa. Means are provided for coordinating the action of the valves with the other mechanisms of the machine, so that the carriage is moved into and out of place in time with the other operations. In Fig. 1, the carriage is shown in position and the valves are in corresponding positions and in Fig. 2, the carriage is shown withdrawn and the valves are in corresponding position. Assume the parts in the position shown in Fig. 2. Pivoted to the upper end of the rack bar 29 is a finger 71 which is spring pressed against the stop 72. As the rack bar 29 moves down to its lower position, the finger 71 contacts with a pin 73 on the rod 69 and moves the rod to the left as shown in Fig. 1. Movement of the rod is accompanied by movement of the valves 62 and 63, to move the piston rod into the cylinder and consequently move the carriage in under the raised taps, as shown in Fig. 1. Mounted on the carriage is the basket 61 which is preferably provided with cone receiving apertures which register with the taps, so that when the cones 74 are released from the taps they are received and held by the basket. The basket is so arranged that it can hold a plurality of nested cones in each aperture without interfering with the operation of the machine.

Means are provided for operating the stripper plates 19 for removing the baked cones from the taps after the basket has been moved into place. Slidably arranged on the guides 16 above the frame 17 is a plate or frame 75 provided with projections 76 alined with the cross bars 23, so that as the frame 75 descends, the projections will strike the cross bars and strip the cones from the taps. The frame 75 is held in its upper position by a spring pressed lever 77 pivoted to the plate 17 and provided at its upper end with a seat 78 which engages under a roller 79 on the frame 75. The lower end of the lever lies in the path of an abutment 81 mounted on the carriage and so placed that it contacts with and trips the lever when the carriage reaches its inner position. When the lever is tripped the frame 75 descends by gravity, the projections 76 strike the stripper bars and the cones are dislodged. Collars 82 secured to the guides 16 limit the downward movement of the frame 75. When the carriage slides out and the plate 17 descends, the lever 77 is righted so that when the plate is subsequently raised, it raises the frame 75.

Means are also provided for introducing charges of batter into the molds. Arranged on the carriage is a box or tray 83 adapted to contain a quantity of batter and from which the batter is introduced into the molds. The box or receptacle 83 is provided on its under side with a plurality of pockets or discharge passages 84, which register with the molds when the carriage is in place. Arranged in the container and registered with and normally disposed slightly above the pockets or cylinders 84 are a plurality of pistons 88 which are adjustably connected to the frame 85 by the nuts 99, and the frame is held in the upward position by means of springs 86. Each piston 88 is provided with a vertical groove 101 extending upward from the bottom and terminated below the top of the piston, and by varying the length of this groove, the amount of batter discharged is varied to suit the requirements of the particular mold and tap. The amount may be further varied by varying the piston with respect to the frame 85, thereby allowing the batter feeding means to be adjusted to each individual mold. The pockets 84 are normally closed at their discharge ends by sliding gates 87 which are withdrawn from below the pockets as the full portion of the pistons enter the pockets. The gates are connected together by suitable bars 89, which are normally held in position to keep the gates closed by springs 91. The bars 89 are pivoted to levers 92, fulcrumed on the carriage and having extensions 93, which are engaged by the curved fingers 94 on the frame 85, when said frame descends. The descending movement of the frame moves the lever 92 to open the gates and permit the batter to discharge from the pockets, and the pockets being full of batter and the plungers 88 being made to fit the pockets rather closely, the measured amount of batter in each pocket is discharged into the molds below. As soon as the frame 85 rises, the finger 94 moves away from the lever 93 and the springs 91 close the gates. Arranged on the opposite ends of the frame 85 are upstanding spring pressed bumpers 95 having inclined upper faces. Depending from the head frame 75 and extending through holes in the plate 17 are rods 96 provided on their lower ends with inclined heads 97 which register with the bumpers 95 when the carriage is in position. When the head frame 75 is released, it falls by gravity, the heads 97 strike the bumpers 95 and depress the frame 85, causing the gates 87 to be opened and the plungers 88 to descend and deliver the charges of batter to the molds. When the frame 85 reaches its lower position and after the batter has been discharged from the pockets 84, a finger 98 on the frame contacts with and moves a spring held lever 103 fulcumed on the frame 2. The other end of the lever engages the lever 68 on the stem of valve 63 and moves the lever 68 to open valve 63 and close valve 62, thereby causing the carriage to be withdrawn.

The upward movement of the tap-carrying plate 17, the inward movement of the carriage, the stripping of the cones from the taps, the introduction of batter into the molds and the removal of the carriage, occur automatically during the time that the latch 46 is in contact with the high face 47 of the shoe 43. The descent of the taps into the molds occurs during the time that the latch 46 is in contact with the low face 49 of the shoe and the baking of the shells occurs during the remainder of the cycle of operations. It is seen that the entire machine is automatic in operation and requires only that the supply of batter in the receptacle 83 be replenished and that the stacks of baked shells be removed from the basket 61. The batter usually contains an active rising principle, such as baking powder or yeast, which is quickly affected by heat and it is therefore desirable that the batter container remain over the heated molds but a short time and the operations of the machine have been timed to produce such result.

We claim:

1. In a machine of the character described, a plurality of split molds, means for heating said molds, a corresponding plurality of taps, said molds and taps being relatively movable, means for separating said taps and molds, means for opening said molds prior to the separation of the taps and molds, whereby the baked shells remain on said taps, a tray movable to position under said taps, means for stripping the baked shells from the taps and means operative by the tray during its movement for throwing said shell discharging means into operation.

2. In a machine of the character described, a plurality of split molds, means for heating said molds, a corresponding plurality of taps, said molds and taps being relatively movable, means for separating said taps and molds, means for opening said molds prior to the separation of the taps and molds, whereby the baked shells remain on said taps, a tray movable to position under said taps, means for moving said tray, means operative by the means for separating the taps and molds during the separating movement for throwing said tray moving means into operation, means for stripping the baked shells from said taps and means operative by the tray during its movement for throwing said stripping means into operation.

3. In a machine of the character described, a plurality of split molds, means for heating said molds, a corresponding plurality of taps, said molds and taps being relatively movable, means for separating said taps and molds, means for opening said molds prior to the separation of the taps and molds, whereby the baked shells remain on said taps, a carriage movable to position between said taps and molds, a shell receiving tray on said carriage arranged to underlie said taps, a batter receptacle on said carriage arranged to overlie said molds, means for stripping the baked shells from the taps, means for discharging batter from said receptacle into said molds and means operative by the carriage during its movement for throwing said stripping means and said batter discharging means into operation.

4. In a machine of the character described, a plurality of split molds, means for heating said molds, a corresponding plurality of taps, said molds and taps being relatively movable, means for separating said taps and molds, means for opening said molds prior to the separation of the taps and molds, whereby the baked shells remain on said taps, a carriage movable to position between said taps and molds, a shell receiving tray on said carriage arranged to underlie said taps, a batter receptacle on said carriage arranged to overlie said molds, means for stripping the baked shells from the taps, means for discharging batter from said receptacle into said molds, means operative by the carriage during its movement for throwing said stripping means and said batter discharging means into operation, means for moving said carriage from between said molds and taps and means operative by said batter discharging means during its movement for throwing said carriage moving means into operation.

5. In a machine of the character described, a plurality of split molds, means for heating said molds, a corresponding plurality of taps, said molds and taps being relatively movable, means for separating said taps and molds, a batter receptacle movable into position above said molds, means on said receptacle for discharging batter into said molds, a vertically movable head arranged above said receptacle, means on said head arranged to engage and operate said batter discharging means and means operative by said receptacle during its movement for releasing said head.

6. In a machine of the character described, a plurality of split molds, means for heating said molds, a corresponding plurality of taps, said molds and taps being relatively movable, means for separating said taps and molds, a batter receptacle movable into position above said molds, means on said receptacle for discharging batter into said molds, a vertically movable head arranged above said receptacle, means operative by the means for separating said taps, and molds for raising said head, means on said head arranged to engage and operate said batter discharging means and means for releasing said head.

7. In a machine of the character described, a plurality of split molds, means for heating said molds, a corresponding plurality of taps, said molds and taps being relatively movable, means for separating said taps and molds, means for opening said molds prior to the separation of said taps and molds whereby the baked shells remain on said taps, a carriage movable to position between said molds and taps, a shell receiving tray on said carriage arranged to underlie said taps, a batter receptacle on said carriage arranged to overlie said molds, means for stripping the baked shells from the taps, means for discharging batter from the receptacle into said molds, a vertically movable head arranged above said taps, means for raising said head, means on said head arranged to contact with and operate said stripping means and batter discharging means and means for releasing said head.

8. In a machine of the character described, a plurality of split molds, means for heating said molds, a corresponding plurality of taps, said molds and taps being relatively movable, means for separating said taps and molds, means for opening said molds prior to the separation of said taps and molds whereby the baked shells remain on said taps, a carriage movable to position between said molds and taps, a shell receiving tray on said carriage arranged to underlie said taps, a batter receptacle on said carriage arranged to overlie said molds, means for stripping the baked shells from the taps, means for discharging batter from the receptacle into said molds, a vertically movable head arranged above said taps, means for raising said head, means on said head arranged to contact with and operate said stripping means and batter discharging means and means operated by the carriage during its inward movement to the end of its stroke for releasing said head.

9. In a machine of the character described, a plurality of split molds, means for heating said molds, a corresponding plurality of taps, said molds and taps being relatively movable, means for separating said taps and molds, means for opening said molds prior to the separation of said taps and molds whereby the baked shells remain on said taps, a carriage movable to position between said molds and taps, a shell receiving tray on said carriage arranged to underlie said taps, a batter receptacle on said carriage arranged to overlie said molds, means for stripping the baked shells from the taps, means for discharging batter from the receptacle into said molds, a vertically movable head arranged above said taps, means for raising said head, means on said head arranged to contact with and operate said stripping means and batter discharging means, means operated by the carriage during its inward movement for releasing said head and means for limiting the downward movement of the head.

10. In a machine of the character described, a plurality of split molds, means for heating said molds, a corresponding plurality of taps, said molds and taps being relatively movable, means for separating said taps and molds, means for opening said molds prior to the separation of said taps and molds whereby the baked shells remain on said taps, a shell receiving tray movable into position below said taps, means for moving said tray into position, means operative by the means for separating said taps and molds during the final portion of its movement for throwing said tray-moving means into operation and means for stripping the baked shells from the molds.

11. In a machine of the character described, a plurality of split molds, means for heating said molds, a corresponding plurality of taps, said molds and taps being relatively movable, means for separating said taps and molds, means for opening said molds prior to the separation of said taps and molds whereby the baked shells remain on said taps, a shell receiving tray movable into position below said taps, means for moving said shell receiving tray into position, means operative by the means for separating said taps and molds during the final portion of its movement for throwing said tray-moving means into operation, means for stripping the baked shells from the taps and means thrown into operation by the shell receiving tray during its movement for operating said stripping means.

12. In a machine of the character described, a main frame, molds on said frame, a tap frame slidably arranged on said main frame, taps on said slidable frame alined with said molds and adapted to enter therein for the purpose described when said tap frame is lowered, a lead screw journaled in said main frame, means for raising and lowering the tap frame, and means on the lead screw for automatically controlling the operation of said raising and lowering means.

13. In a machine of the character described, a main frame, molds on said frame, a tap frame slidably arranged on said main frame, taps on said slidable frame alined with said molds and adapted to enter therein for the purpose described when said tap frame is lowered, a lead screw journaled in said main frame, means for raising and lowering the tap frame, means on the lead screw for automatically controlling the operation of said raising and lowering means, and means for adjusting the length of the period between successive operations of said controlling means.

14. In a machine of the character described, a main frame, molds on said frame, a tap frame slidably arranged on said main frame, taps on said slidable frame alined with said molds and adapted to enter therein for the purpose described when said tap frame is lowered, a lead screw journaled in said main frame, means for raising and lowering the tap frame, means on the lead screw for automatically controlling the operation of said raising and lowering means, and adjustable means for automatically reversing the direction of rotation of said lead screw whereby the length of the period between successive operations of said controlling means may be altered.

15. In a machine of the character described, a main frame, molds on said frame, a tap frame slidably arranged on said main frame, taps on said slidable frame alined with said molds and adapted to enter therein for the purpose described when said tap frame is lowered, a lead screw journaled in said main frame, means for raising and lowering the tap frame, means for automatically supplying said molds with batter while said tap frame is raised, means for heating said molds, means on the lead screw for automatically controlling the operation of said raising and lowering means, and means for adjusting the interval of time between lowering and raising said tap frame.

16. In a machine of the character described, a main frame, molds on said frame, a tap frame slidably arranged on said main frame, taps on said slidable frame alined with said molds and adapted to enter therein for the purpose described when said tap frame is lowered, a lead screw journaled in said main frame, means for raising and lowering the tap frame, means on the lead screw for automatically controlling the operation of said raising and lowering means, a batter receptacle, means for automatically moving said receptacle into position above said molds while said tap frame is raised, batter feeding mechanism for filling the molds automatically thrown into operation by said batter receptacle, means for automatically reversing the operation of said receptacle-moving means whereby said receptacle is withdrawn prior to the lowering of said tap frame, and means for heating said molds.

In testimony whereof, we have hereunto set our respective hands at San Francisco, California, this 7th day of February, 1917.

OSCAR HAUGE.
WILLIAM A. ENGLAND.

In presence of—
H. G. PROST.